D. W. ADAMS.
POSITION LOCATING INSTRUMENT.
APPLICATION FILED SEPT. 25, 1911.
1,018,150.
Patented Feb. 20, 1912.
2 SHEETS—SHEET 2.
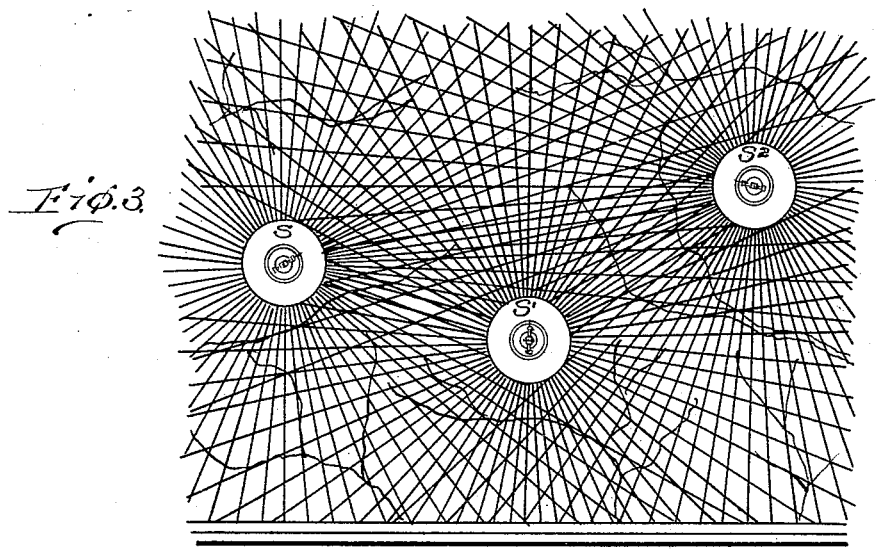
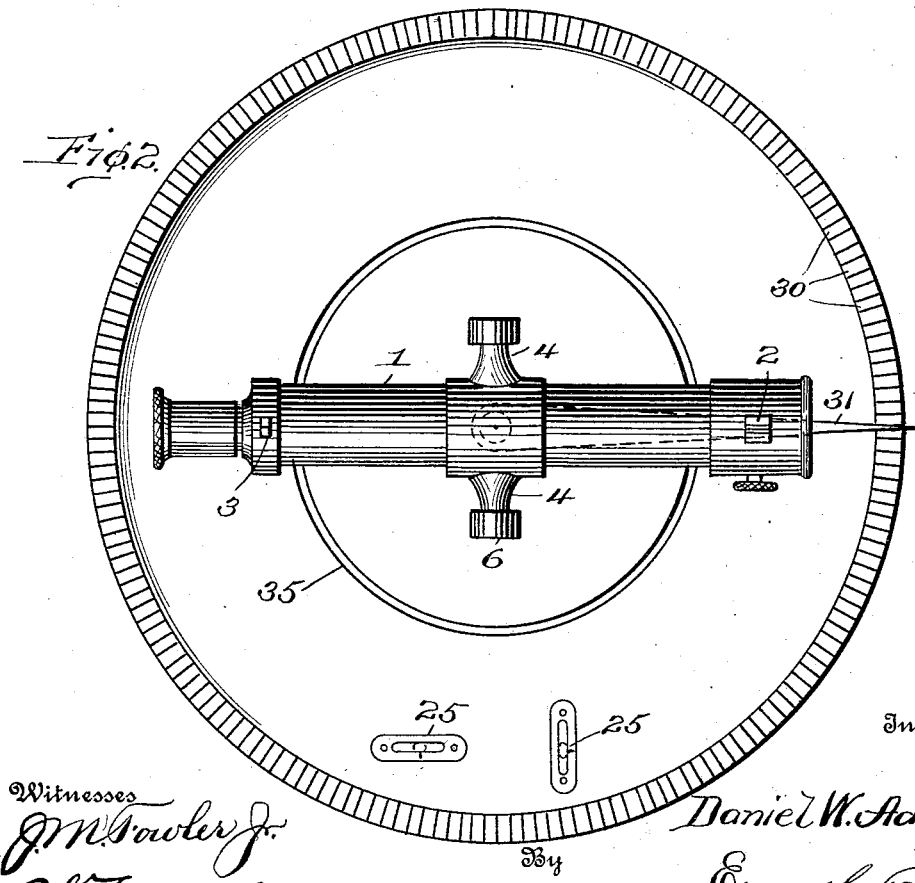

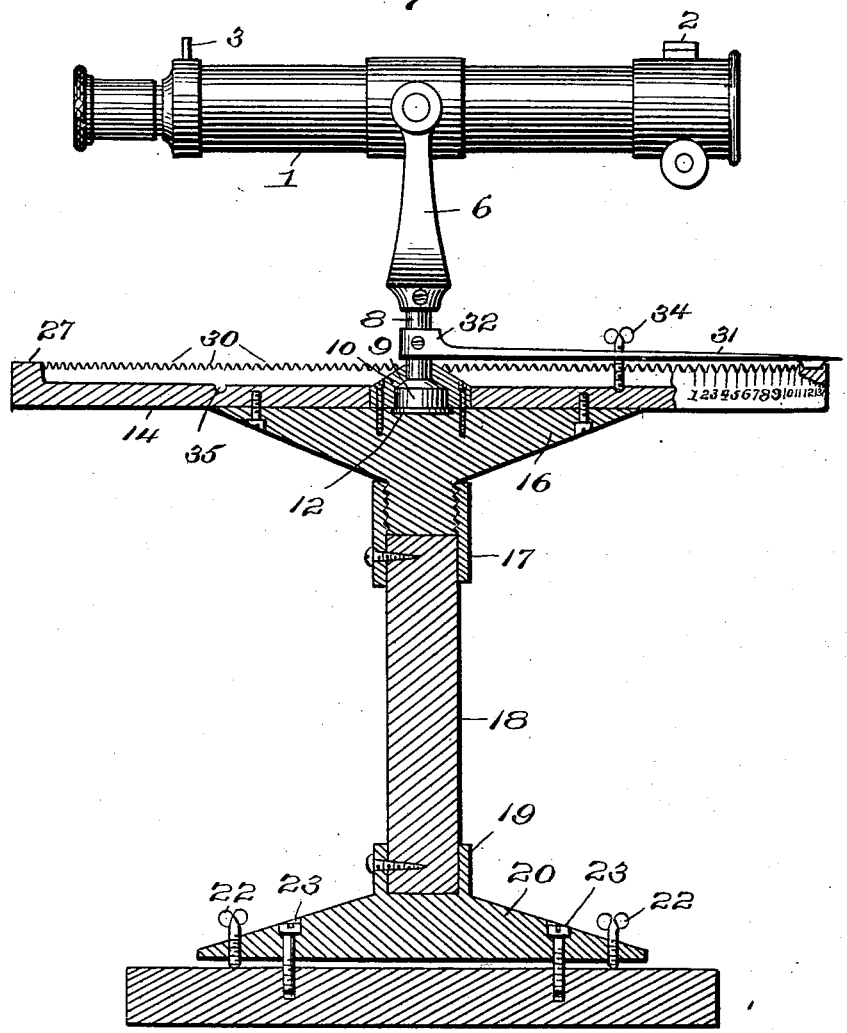

UNITED STATES PATENT OFFICE.

DANIEL W. ADAMS, OF GLENDALE SPRINGS, NORTH CAROLINA.

POSITION-LOCATING INSTRUMENT.

1,018,150.   Specification of Letters Patent.   Patented Feb. 20, 1912.

Application filed September 25, 1911. Serial No. 651,161.

*To all whom it may concern:*

Be it known that I, DANIEL W. ADAMS, a citizen of the United States, residing at Glendale Springs, in the county of Ashe and State of North Carolina, have invented new and useful Improvements in Position-Locating Instruments, of which the following is a specification.

This invention relates to apparatus for determining with accuracy the location of an object without the use of the usual surveying instruments or mathematical computations.

My invention is particularly adapted to locating forest fires, although it may be used as a range finder for other purposes.

It is customary to employ watchers or rangers upon large forest reservations, who are constantly upon the lookout to detect a fire and to promptly despatch men to extinguish it.

It is the object of my invention to provide a simple range finding apparatus which may be used by unskilled persons to locate a fire or other object quickly and with precision.

The general method of locating a fire or other object by means of observations from two or more stations is the same as that described in my prior Patent No. 1,003,854. A number of watch-stations are located at different points in the reservation or district to be guarded, at convenient distances apart, as from five to twenty miles, and preferably situated upon hilltops or elevations. Communication is established between these stations by means of telephone or other signaling means. When an object is to be located, as a column of smoke indicating a fire, the attendant sights the object with the range-finder and communicates the number corresponding to his range-line to the attendant at the next adjacent station, who likewise makes an observation and communicates his range-line to the first attendant. By means of my range-finder map of the district showing the location of the stations and the range lines radiating from each station, each attendant can now instantly locate the exact position of the fire by noting the intersection of the two range-lines.

My invention will be understood from the following description in connection with the accompanying drawings, in which—

Figure 1 is a side elevation, partly in section, of my range finder; Fig. 2, is a top plan view thereof; and Fig. 3 represents my range finder map of some district, showing the location of the watch or signal stations and having indicated thereon the range lines radiating from the center of each station.

The range-finder comprises a sighting telescope 1 which I provide with external front and rear gun-sights 2, 3, to be used in case the lenses are covered with moisture or when it is too dark to use the telescope. The telescope is provided with the usual trunnions 4, having bearings in a yoke-support 6, carried upon a stem 8, provided with an enlarged step bearing 9, rotatably held in the housing or casing 10 and supported upon a disk 12, which may be of leather and contain a lubricant or it may be a spring plate. The base plate 14 may be bolted to a supporting block or table 16, having a depending cuff or sleeve 17 threaded thereto and fastened to the pedestal 18, which may conveniently be constructed of wood. The lower end of the pedestal is secured in a socket 19, extending upwardly from the base 20, which is provided with leveling screws 22 and lock-bolts or screws 23. After the instrument is leveled by means of the screws 22, as indicated by the bubbles 25, the standard is securely fastened to the foundation by means of the locking-bolts 23.

For determining instantly the range-line corresponding to the line of sight of the telescope in any adjusted position, I provide the base plate with a peripheral flange 27, having in its upper surface a series of regularly spaced notches 30, preferably 180, each spaced two degrees from the adjacent notches, each notch being numbered serially upon the outer peripheral surface of the flange to correspond with a range-line upon the range-finder map. A spring-arm pointer 31, having a boss 32 surrounding and fastened to the stem 8, is adapted to snap from one notch to another as the telescope is turned in one direction or the other, the outer end of the pointer preferably projecting beyond the peripheral base flange to facilitate the reading of the corresponding range-line number. If it is desired to swing the telescope around through a large arc, the pointer may be raised to pass over the notches by means of the adjusting screw 34, which is adapted to move in a groove 35 in the base plate.

The attendant or ranger at each station is provided with one of my range-finder maps of the district, illustrated in Fig. 3, upon which are indicated the several stations, S, S′, S², and from the center of each are projected the radiating range-lines, uniformly numbered and preferably indicated in the margins. The main topographical features and landmarks, as well as the boundary and section lines, may be indicated upon the map. At each station one of the range-finder instruments is set up upon any suitable base, with the series of numbered notches accurately corresponding with the range lines as indicated upon the map.

The use of my apparatus in determining the location of an object will be apparent to engineers from the foregoing description. If, for instance, a ranger discovers a column of smoke, he sights the same through the telescope or across the gun sights thereon, and from the notch which forms a stop for the spring pointer he notes the number upon the peripheral flange which corresponds to the range-line in the line of sight. After communicating with the ranger or attendant at an adjoining station and learning the range-line corresponding with his line of sight to the column of smoke, he refers to the range-finder map and notes the point of intersection of the two range-lines, which accurately locates the fire. A party may be despatched at once to the exact location to extinguish the fire before it has gained headway and without any loss of time.

The advantages incident to the use of my apparatus will be appreciated by rangers and engineers who are familiar with the difficulties of locating objects such as fires in forests, the apparent distances of which are exceedingly deceptive. The precise location is determined quickly and without the use of complicated surveying instruments or the necessity for mathematical calculations incident to their use. The annular series of regularly spaced notches or indicating stops determine at a glance the precise range-line upon which the fire or other object is located. Any firm or substantial base is sufficient as a support upon which the instrument may be mounted, and by means of the coöperating leveling screws and locking bolts the instrument is positively held in a true horizontal plane.

I have described in detail the construction illustrated in the drawings for the purpose of disclosing an embodiment of my invention, but I am aware that changes may be made therein without departing from the spirit of my invention.

I claim:—

1. A position-locating instrument comprising a base plate having an annular series of indicating stops, a sighting member mounted to swing concentrically thereover, a pointer secured to said sighting member and adapted to engage said stops, and an annular series of designating characters corresponding with said stops.

2. A position-locating instrument comprising a base plate having an annular series of indicating stops, a sighting member centrally pivoted to swing thereover, a spring arm secured to said sighting member and adapted to yieldingly engage said stops, adjustable means for maintaining said arm in raised position to swing freely over said stops, and an annular series of designating characters corresponding with said stops.

In testimony whereof I have hereunto set my hand in presence of two subscribing witnesses.

DANIEL W. ADAMS.

Witnesses:
 PHILANDER C. JOHNSON,
 WILLIAM SCHERER.

Copies of this patent may be obtained for five cents each, by addressing the "Commissioner of Patents, Washington, D. C."